(No Model.) 2 Sheets—Sheet 2.
G. F. RANSOM.
GAS APPARATUS.

No. 576,499. Patented Feb. 2, 1897.

UNITED STATES PATENT OFFICE.

GEORGE F. RANSOM, OF MILWAUKEE, WISCONSIN, ASSIGNOR, BY DIRECT AND MESNE ASSIGNMENTS, OF THREE-FOURTHS TO GEORGE F. RANSOM, JR., OF SAME PLACE, AND LUCAS D. DORSCHEL, OF CHILTON, WISCONSIN.

GAS APPARATUS.

SPECIFICATION forming part of Letters Patent No. 576,499, dated February 2, 1897.

Application filed December 27, 1895. Serial No. 573,553. (No model.)

*To all whom it may concern:*

Be it known that I, GEORGE F. RANSOM, a citizen of the United States, and a resident of Milwaukee, in the county of Milwaukee and State of Wisconsin, have invented certain new and useful Improvements in Gas Apparatus; and I do hereby declare that the following is a full, clear, and exact description thereof.

My invention has for its object to provide a simple automatic apparatus for the economical production of a gas that may be utilized for illumination and heating purposes, the said apparatus being especially designed as a domestic plant and consisting in certain peculiarities of construction and combination of parts hereinafter set forth with reference to the accompanying drawings and subsequently claimed.

Figure 1:
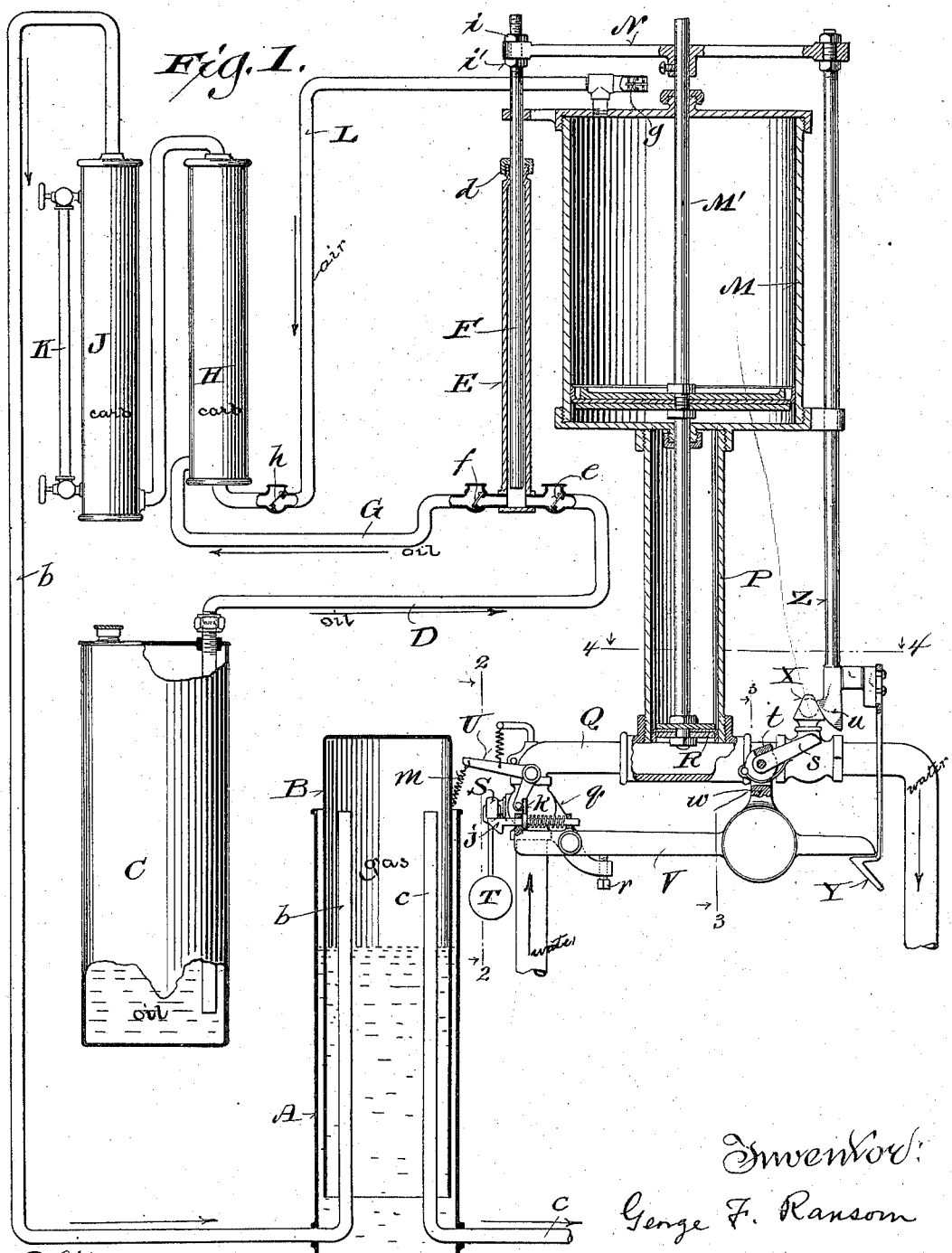
Figure 2:
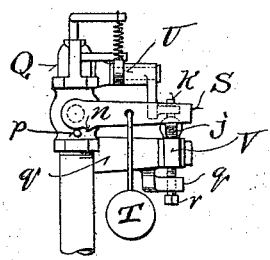
Figure 3:
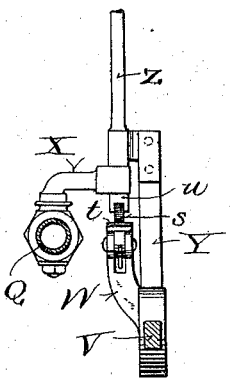
Figure 4:
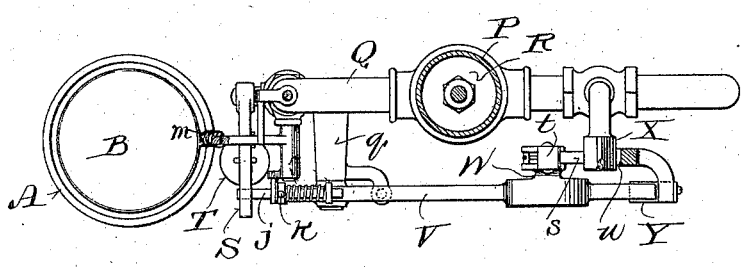

In the drawings, Figure 1 represents an elevation of one form of my gas apparatus, partly in section; Fig. 2, a detail elevation of a cut-off mechanism involved in the apparatus as viewed on the plane indicated by line 2 2 of Fig. 1; Fig. 3, a similar view of another cut-off mechanism embodied in said apparatus as viewed on line 3 3 of Fig. 1; and Fig. 4 a detail plan view, partly in horizontal section, on line 4 4 of said Fig. 1.

Referring by letter to the drawings, I show an ordinary gas-holder consisting of a water-containing tank A and an open-end cylinder B, reciprocative in the tank, the gas being introduced and withdrawn through pipes b c, terminating above the level of the water in said tank.

A tank C constitutes a source of supply for gasolene or other suitable liquid with which to saturate air for the purpose of producing gas, and a pipe D, leading from near the bottom of the tank, connects with the lower end of a lift-pump, the latter, as herein shown, being preferably a cylinder E, provided with a stuffing-box d and a rod-plunger F, reciprocative in the stuffing-box. The pipe D is provided with a check-valve e, that opens toward the pump, and another pipe G, leading from the lower end of said pump, is provided with a check-valve f, that opens from the same. The pipe G connects the pump with a generator H, consisting of a cylinder that in practice contains a mass of sponge or other suitable absorbent material. This generator may be multiplied as many times as may be found desirable, it being herein shown in pipe connection with another generator J, parallel thereto, although it may be preferable to have said pipe-connected generators in line one above another. As herein shown, a fluid-gage K may be used in connection with the generator system, and the latter connects with the pipe b, leading into the gas-holder.

A pipe L connects the generator H and an air-pump M, the open end of the pipe, beyond its coupling with the air-pump, being provided with an air-check valve g, and another check-valve h is located in said pipe adjacent to said generator.

The piston-rod M' of the air-pump is provided with a cross-head N, engaged by the plunger F of the liquid-pump above specified, and in order to regulate the lift of said plunger the latter is provided with an adjustable stop i above the cross-head, there being a fixed stop i on the aforesaid plunger below said cross-head.

The air-pump piston may be lifted by any suitable power, but it is essential that this power be automatically controlled and operate at regular intervals proportionate with the consumption of gas generated by a saturation of air with gasolene or other suitable liquid drawn from the tank C, above specified.

As a matter of preference I show my gas-producing apparatus embodying means for utilization of a city water-supply as a power for lifting the air-pump piston at the required intervals, these means involving automatically-actuated inlet and exhaust cut-off mechanisms. In carrying out this specific feature of my invention I provide the air-pump cylinder with a depending cylinder P, that is coupled to a pipe Q of a water-supply system, a piston R in the latter cylinder being fast on a continuation of the air-pump piston-rod M', as is clearly shown in Fig. 1.

Admission of water to the pipe Q is governed by a stop-cock having its handle in the form of a lever S, from which a weight T is hung, this lever being held in normal position by a spring-controlled latch $j$, loose in suitable guides. A spring-controlled stop-limited bell-crank U opposes a lug $k$, extended from the latch, and provision must be made to swing the bell-crank on its pivot when the cylinder B, constituting part of the gas-holder, descends a predetermined distance. As herein shown, I prefer to connect an arm of the bell-crank with the gas-holder cylinder by means of a spiral spring $m$, sufficiently stiff as to cause a throw of said crank and retraction of the lever-supporting latch $j$ before yielding to possible continued descent of said cylinder. In order to limit the play of the stop-cock lever, the latter may be provided with a lug $n$ for contact with a stop $p$, herein shown on the casing of said stop-cock, but any form and arrangement of stop may be employed.

The latch $j$ has its guides on a weighted lever V, pivoted to a bracket $q$ or other suitable support and limited as to downward movement by any suitable means, a screw-stop $r$ being preferred. A vertical arm W, extended from lever V, carries a pivotal spring-controlled finger $s$, that normally abuts a suitable stop $t$, and this finger is arranged to operate in conjunction with the lever-handle X of a stop-cock that governs the outflow of waste water from pipe Q, above specified, it being understood that said finger slips past the adjacent lever-handle when lever V is lifted, but exerts force against the same when said lever descends to normal position to thereby open said stop-cock. The lift of lever V is effected by means of a reciprocative trip-catch Y, that is herein shown suspended from a rod Z, made fast to the cross-head N on the piston-rod M' of the air-pump, and the foot $u$ of this rod is in the form of a cam that operates to swing the lever-handle X in a direction necessary to close the exhaust stop-cock of pipe Q, this action taking place prior to an opening of the inlet stop-cock pertaining to said pipe.

Assuming that the parts are in the positions shown in Fig. 1, the continued descent of gas-holder cylinder B will cause a pull on the bell-crank U, and thus the latter will operate to retract latch $j$, thereby permitting descent of lever S to effect an opening of the inlet stop-cock of pipe Q, the outlet or waste stop-cock of said pipe remaining closed. The inflow of water under pressure operating upon the piston R in cylinder P causes a lift of the air-pump piston, and the air previously drawn into said pump through the valve end of pipe L is forced out through the generator system and saturated with the gasolene or other suitable liquid, the gas thus generated being accumulated in the holder and expelled therefrom to an open burner or burners in a supply system embodying the pipe $c$, leading from said holder.

The lift-pump plunger is drawn up by the cross-head N on the piston-rod M' of the air-pump to elevate a fresh supply of gasolene or other suitable liquid from the supply-tank C, and upon descent of said plunger said liquid will be forced into the generators to recharge the same. The lift of the air-pump piston also swings the lever V on its pivot, through the medium of the trip-catch Y, to thereby bring the pivotal spring-controlled finger $s$ into working position opposite the stop-cock lever X and at the same time permit the latch $j$ to come under the other stop-cock lever S, this being the normal position of said latch. The trip-catch having cleared weighted lever V the latter descends of its own gravity and, by the lift of latch $j$ coincident with pressure of finger $s$, the water-supply is cut off simultaneously with the opening of the waste-cock, the latter remaining open until the cam-foot $u$ of rod Z exerts pressure against the lever-handle of said stop-cock. As the gas is consumed the above-described automatic action of the apparatus is repeated, the repetitions going on indefinitely as long as the gas is being utilized.

From the foregoing it will be seen that the gas is manufactured at regular intervals proportionate with its consumption and remains approximately constant as to quality, the latter being variable in proportion as the lift-pump plunger is adjusted with respect to the cross-head of the air-pump piston-rod. It is also to be observed that the multiplication of the generators has the effect of enriching the gas, and that the yielding connection between the gas-holder and latch-retractor bell-crank will permit continued gradual descent and pressure of the gas-holder cylinder should the pressure of the water be for a limited time insufficient to actuate the air-pump. However, I do not confine myself to a connection, flexible or otherwise, between latch-retractor and gas-holder, although it is necessary that the latter operate the former.

Having now fully described my invention, what I claim as new, and desire to secure by Letters Patent, is—

1. A gas apparatus comprising a tank for gasolene or analogous liquid, a pump for this liquid and at least one generator in circuit with the tank, an air-pump that discharges into the generator and coöperates with the pump aforesaid, a reciprocative gas-holder in connection with said generator, a motor for the pumps, suitable mechanism operated by the gas-holder to start the motor, and other suitable mechanism operated by the air-pump to stop said motor.

2. A gas apparatus comprising a tank for gasolene or analogous liquid, a pump for this liquid and a plurality of generators in circuit with the tank, an air-pump that discharges into the generator system and coöperates with the pump aforesaid, a reciprocative gas-holder in connection with said generator system, a motor for the pumps, suitable mechanism operated by the gas-holder to start the motor, and other suitable mechanism operated by the air-pump to stop said motor.

3. A gas apparatus comprising a tank for gasolene or analogous liquid, a liquid-pump and at least one generator in circuit with the tank, an air-pump that discharges into the generator and coöperates with the liquid-pump, a reciprocative gas-holder in connection with said generator, a conveyer for fluid under pressure exertive against the air-pump piston, and suitable mechanism operated by said gas-holder and air-pump to effect intermittent flow and waste of said fluid.

4. A gas apparatus comprising a tank for gasolene or analogous liquid, a liquid-pump and a plurality of generators in circuit with each other and the tank, an air-pump that discharges into the generator system and coöperates with the pump aforesaid, a reciprocative gas-holder in connection with said generator system, a conveyer for fluid under pressure exertive against the air-pump piston, and suitable mechanism operated by said gas-holder and air-pump to effect intermittent flow and waste of said fluid.

5. A gas apparatus comprising a tank for gasolene or analogous liquid, a pump for this liquid in connection with the tank, an air-pump having its piston-rod connected to the plunger of the pump aforesaid, at least one generator connected to both pumps, a gas-holder connected to the generator, a conveyer for fluid under pressure, a cylinder that depends from the air-pump and is coupled to said conveyer, a piston in the cylinder on a continuation of the air-pump piston-rod, supply and waste stop-cocks fitted in the aforesaid conveyer, and controlling mechanism for the stop-cocks coöperative with the gas-holder and air-pump.

6. A gas apparatus comprising a tank for gasolene or analogous liquid, a pump for this liquid in connection with the tank, an air-pump having its piston-rod connected to the plunger of the pump aforesaid, a plurality of generators connected to each other and both pumps, a gas-holder in connection with the generator farthest from the tank, a conveyer for fluid under pressure, a cylinder that depends from the air-pump and is coupled to said conveyer a piston in the cylinder on a continuation of the air-pump piston-rod, supply and waste stop-cocks fitted to the aforesaid conveyer, and controlling mechanism for the stop-cocks coöperative with the gas-holder and air-pump.

7. A gas apparatus comprising a gas-holder, an air-pump having a depending cylinder that couples with a conveyer for fluid under pressure, a piston in the cylinder on a continuation of the air-pump piston-rod, supply and waste stop-cocks fitted to said conveyer, and automatic controlling mechanism for the stop-cocks coöperative with the gas-holder and air-pump.

8. A gas apparatus comprising a gas-holder, an air-pump having a depending cylinder that couples with a conveyer for fluid under pressure, a piston in the cylinder on a continuation of the air-pump piston-rod, supply and waste stop-cocks fitted to said conveyer, a tilt-lever, an automatic latch carried by the lever to come under the handle of the supply stop-cock, suitable means for actuating said handle upon release of the latch, a latch-retractor operative in conjunction with the gas-holder, a lever trip-catch and waste stop-cock closer reciprocative with said air-pump piston-rod, and a waste stop-cock opener carried by said lever.

9. A gas apparatus comprising a gas-holder, an air-pump having a depending cylinder that couples with a conveyer for fluid under pressure, a piston in the cylinder on a continuation of the air-pump piston-rod, supply and waste stop-cocks fitted to said conveyer, a tilt-lever an automatic latch carried by the lever to come under the handle of the supply stop-cock, suitable means for actuating said handle upon release of the latch, a latch-retractor flexibly connected to the gas-holder, a lever trip-catch and a waste stop-cock closer reciprocative with said air-pump piston-rod, and a waste stop-cock opener carried by said lever.

10. A gas apparatus comprising a gas-holder, an air-pump having a depending cylinder that couples with a conveyer for fluid under pressure, a piston in the cylinder on a continuation of the air-pump piston-rod, supply and waste stop-cocks fitted to said conveyer, a tilt-lever, an automatic latch carried by the lever to come under the handle of the supply stop-cock, suitable means for actuating said handle upon release of the latch, a latch-retractor, operative in conjunction with the gas-holder, a lever trip-catch and a waste stop-cock closer reciprocative with said air-pump piston-rod, and a finger that being carried by said lever clears the waste stop-cock handle coincident with a lift of the trip-catch but exerts pressure on said handle upon disengagement of said trip-catch from the aforesaid lever.

In testimony that I claim the foregoing I have hereunto set my hand, at Milwaukee, in the county of Milwaukee and State of Wisconsin, in the presence of two witnesses.

GEO. F. RANSOM.

Witnesses:
N. E. OLIPHANT,
B. C. ROLOFF.